United States Patent
Tao

(10) Patent No.: US 12,291,066 B2
(45) Date of Patent: May 6, 2025

(54) VEHICLE CONTROL METHOD AND APPARATUS, VEHICLE, STORAGE MEDIUM AND CHIP

(71) Applicant: Xiaomi EV Technology Co., Ltd., Beijing (CN)

(72) Inventor: Feng Tao, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 227 days.

(21) Appl. No.: 17/895,485

(22) Filed: Aug. 25, 2022

(65) Prior Publication Data
US 2023/0406057 A1    Dec. 21, 2023

(30) Foreign Application Priority Data
May 31, 2022    (CN) .......................... 202210613090.6

(51) Int. Cl.
*B60G 17/015*    (2006.01)
*B60G 17/052*    (2006.01)

(52) U.S. Cl.
CPC ..... *B60G 17/0155* (2013.01); *B60G 17/0525* (2013.01); *B60G 2400/252* (2013.01); *B60G 2400/51222* (2013.01)

(58) Field of Classification Search
CPC .................. B60G 17/0155; B60G 2400/51222
See application file for complete search history.

(56) References Cited

U.S. PATENT DOCUMENTS

| | | |
|---|---|---|
| 2017/0151852 A1 | 6/2017 | Ohashi et al. |
| 2021/0178847 A1* | 6/2021 | Hein ...................... B60G 11/27 |
| 2022/0032715 A1 | 2/2022 | Scherba et al. |

FOREIGN PATENT DOCUMENTS

| | | | |
|---|---|---|---|
| CN | 1839058 A | | 9/2006 |
| CN | 103241097 A | | 8/2013 |
| CN | 103660837 A | * | 3/2014 |
| CN | 105501021 A | | 4/2016 |
| CN | 207670135 U | | 7/2018 |
| CN | 108725123 A | | 11/2018 |
| CN | 108839532 A | | 11/2018 |
| CN | 208789430 U | | 4/2019 |
| CN | 108099533 A | | 6/2019 |
| CN | 110254155 A | * | 9/2019 |
| CN | 111497549 A | | 8/2020 |

(Continued)

OTHER PUBLICATIONS

Extended European Search Report issued on May 26, 2023 for European Patent Application No. 22192567.0.

(Continued)

*Primary Examiner* — Michael C Zarroli
(74) *Attorney, Agent, or Firm* — Volpe Koenig

(57) ABSTRACT

A vehicle control method is provided. The vehicle includes an air suspension system, an air spring and an air storage tank in the air suspension system, which are connected through an air circuit. The method includes: obtaining a spring air pressure of the air spring and an air tank air pressure of the air storage tank; and adjusting, in response to determining that the spring air pressure and the air tank air pressure meet a preset condition, a height of an axle corresponding to the air spring in the vehicle by controlling connection or disconnection of the air circuit between the air spring and the air storage tank.

17 Claims, 7 Drawing Sheets

(56) References Cited

FOREIGN PATENT DOCUMENTS

| | | | |
|---|---|---|---|
| CN | 111845240 A | 10/2020 |
| CN | 112455175 A | 3/2021 |
| CN | 113246680 A | 8/2021 |
| DE | 102017111662 A1 | 11/2017 |
| DE | 112018000542 B4 | 9/2021 |
| EP | 2239156 A2 | 10/2010 |
| GB | 2612071 A | 4/2023 |
| JP | 2004352091 A | 12/2004 |
| JP | 2007-182197 A | 7/2007 |
| JP | 2011246882 A | 12/2011 |
| JP | 2011247291 A | 12/2011 |
| JP | 2015105005 A | 6/2015 |
| JP | 2015105007 A | 6/2015 |
| JP | 2018118709 A | 8/2018 |
| KR | 19990017216 A | 3/1999 |
| KR | 20070021237 A | 2/2007 |

OTHER PUBLICATIONS

Chinese Office Action issued on Jul. 28, 2023 for Chinese Patent Application No. 2022106130906.
Chinese Office Action issued on Oct. 17, 2023 for Chinese Patent Application No. 202210613090.6.

* cited by examiner

VEHICLE CONTROL METHOD AND APPARATUS, VEHICLE, STORAGE MEDIUM AND CHIP

CROSS REFERENCE TO RELATED APPLICATION

The present application claims the benefit of priority to the Chinese application No. 202210613090.6 filed on May 31, 2022, the contents of which are incorporated herein by reference in their entireties for all purposes.

BACKGROUND

An air suspension system is one of the most popular products in a vehicle industry, especially in the field of electric vehicles. Its greatest strength is to not only improve riding comfort of occupants, but also reduce energy consumption of vehicles and achieve effects of energy saving and environmental protection.

SUMMARY

According to a first aspect of an example of the disclosure, a vehicle control method is provided. A vehicle includes an air suspension system, an air spring and an air storage tank in the air suspension system, which are connected through an air circuit, and the method includes:
obtaining a spring air pressure of the air spring and an air tank air pressure of the air storage tank; and
adjusting, in response to determining that the spring air pressure and the air tank air pressure meet a preset condition, a height of an axle corresponding to the air spring in the vehicle by controlling connection or disconnection of the air circuit between the air spring and the air storage tank.

According to a second aspect of an example of the disclosure, a vehicle is provided, including:
an air suspension system, in which an air spring and an air storage tank in the air suspension system are connected through an air circuit;
a processor; and
a memory for storing an executable instruction of the processor; in which
the processor is configured to:
obtain a spring air pressure of the air spring and an air tank air pressure of the air storage tank; and
adjust, in response to determining that the spring air pressure and the air tank air pressure meet a preset condition, a height of an axle corresponding to the air spring in the vehicle by controlling connection or disconnection of the air circuit between the air spring and the air storage tank.

According to a third aspect of an example of the disclosure, a computer readable storage medium is provided, storing a computer program instruction. The program instruction, when executed by a processor, configures the processor to:
obtain a spring air pressure of the air spring and an air tank air pressure of the air storage tank; and
adjust, in response to determining that the spring air pressure and the air tank air pressure meet a preset condition, a height of an axle corresponding to the air spring in the vehicle by controlling connection or disconnection of the air circuit between the air spring and the air storage tank.

According to a fourth aspect of an example of the disclosure, a chip is provided, including a processor and an interface. The processor is configured to execute the vehicle control method provided by the first aspect of the disclosure by reading an instruction.

It should be understood that the above general description and the following detailed description are merely illustrative and explanatory, and cannot limit the disclosure.

BRIEF DESCRIPTION OF THE DRAWINGS

Accompanying drawings here, which are incorporated in and constitute a part of this specification, illustrate examples consistent with the disclosure and together with the specification serve to explain the principles of the disclosure.

DETAILED DESCRIPTION

Figure 1:
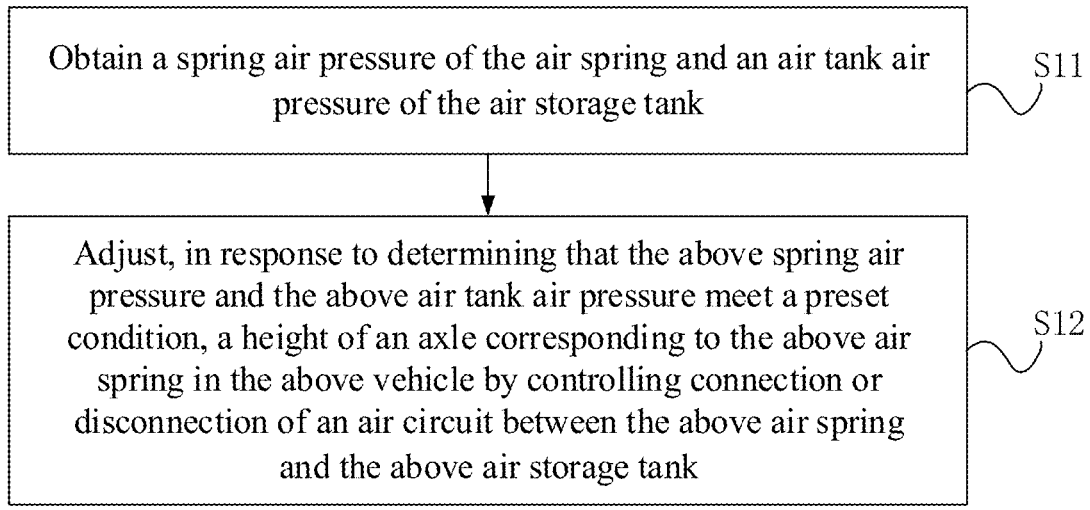
FIG. 1 is a flow diagram of a vehicle control method shown according to an example.

Examples will be described in detail here, instances of which are represented in accompanying drawings. When the following description refers to the accompanying drawings, the same number in the different accompanying drawings represents the same or similar elements unless otherwise indicated. The implementations described in the following examples do not represent all implementations consistent with the disclosure. On the contrary, they are merely examples of an apparatus and method consistent with some aspects of the disclosure as detailed in the appended claims.

It should be noted that all actions of obtaining a signal, information or data in the present disclosure are performed under the premise of complying with the corresponding data protection regulations and policies of the local country, and with authorization of the corresponding apparatus owner.

The disclosure relates to the technical field of vehicles, in particular to a vehicle control method and apparatus, a vehicle, a storage medium and a chip.

As users have higher and higher requirements for vehicle comfort, more and more vehicles are currently equipped with an air suspension system.

The air suspension system forms compressed air through an air compressor, and sends the compressed air to an air chamber of the air spring to compress or extend a spring, so as to change a height of the vehicle. Hence, the compressor is a very important apparatus in the air suspension system. However, the compressor is frequently used, which greatly shortens the service life of the air suspension system.

In view of the above problem, the present example provides a vehicle control method and apparatus, a vehicle, a storage medium and a chip. By utilizing a pressure difference between an air spring and an air storage tank, gas between the air spring and the air storage tank naturally flows to adjust a height of an axle corresponding to the air spring, so use frequency of a compressor is reduced, and a service life of an air suspension system is prolonged.

An application environment of the vehicle control method provided by the present example is introduced below. The vehicle control method may be applied to the vehicle, and the vehicle may include a vehicle body, the air suspension system and an electronic control unit (ECU), namely a vehicle-mounted computer, disposed in the vehicle body. The vehicle-mounted computer is in communication connection with the air suspension system to obtain data pertaining to the air suspension system and to control the air suspension system.

The air suspension system may include a plurality of air springs, a compressor, an air storage tank, and a detection apparatus. The plurality of air springs, the compressor and the air storage tank may be connected through an air circuit, so as to realize gas exchange among the plurality of air springs, the compressor, and the air storage tank. The compressor may change an air pressure in the air springs by compressing gas from the outside or from the air storage tank into the air springs. The air storage tank may collect excess gas from the air springs.

The plurality of air springs may include two front axle air springs disposed at left and right ends of a front axle of the vehicle, and two rear axle air springs disposed at left and right ends of a rear axle of the vehicle.

The air circuit is further provided with a plurality of valves, and the valves are connected with the vehicle-mounted computer. The vehicle-mounted computer may adjust the air pressure in the plurality of air springs by controlling the valves. When the air springs expand and contract according to change of the air pressure, the height of the vehicle may be adjusted.

The detection apparatus may include a height sensor for detecting the height of the axle, a pressure sensor for detecting the air pressure in the air springs and the air storage tank, and the like.

FIG. 1 is a flow diagram of a vehicle control method shown according to an example. As shown in FIG. 1, the method is used in a vehicle, and may be specifically applied to a vehicle-mounted computer in the vehicle. The vehicle control method may include the following steps:

in step S11, a spring air pressure of the above-described air spring and an air tank air pressure of the above-described air storage tank are obtained.

In some implementations, a pressure sensor includes a first pressure sensor disposed in the air spring and a second pressure sensor disposed in the air storage tank, and the vehicle-mounted computer may obtain the spring air pressure and the air tank air pressure by receiving the spring air pressure collected and uploaded by the first pressure sensor and the air tank air pressure collected and uploaded by the second pressure sensor in real time.

Optionally, a load on spring F of the air spring may further be determined according to vehicle parameters of the vehicle obtained in advance, and then the spring air pressure P of the air spring is calculated through the following formula:

$$P = \frac{F}{A}$$

where, A is an effective bearing area of the air spring, which is determined by a structure of the air spring.

It may be understood that the spring air pressure of the air spring refers to a gas pressure intensity in an air chamber of the air spring.

In step S12, in response to determining that the above-described spring air pressure and the above-described air tank air pressure meet a preset condition, a height of an axle corresponding to the above-described air spring in the above-described vehicle is adjusted by controlling connection or disconnection of the air circuit between the above-described air spring and the above-described air storage tank.

In some implementations, the vehicle-mounted computer may compare the spring air pressure with the air tank air pressure. If a comparison result is that: the spring air pressure and the air tank air pressure are inconsistent, it is determined that the spring air pressure and the air tank air pressure meet the preset condition. At the moment of the comparison, it may indicate that there is a pressure difference between the air spring and the air storage tank. In response to connecting the air circuit between the air spring and the air storage tank, gas will spontaneously flow between the air storage tank and the air spring due to the pressure difference. Accordingly, the spring air pressure in the air spring will also change, resulting in a change in the height of the axle corresponding to the air spring.

For example, the air springs are air springs at two ends of a front axle of the vehicle, and the spring air pressure of the air springs is greater than the air tank air pressure of the air storage tank. In response to determining that the vehicle-mounted computer needs to lower the height of the front axle of the vehicle, the air circuit between the air spring and the above-described air storage tank may be controlled to be connected (for example, opening the valve disposed on the air circuit between the air spring and the air tank), so that gas in the air spring flows into the air storage tank. After an air volume in the air spring decreases, the front axle of the vehicle will be naturally lowered. In a lowering process of the front axle, the vehicle-mounted computer may detect the height of the front axle in real time through the height sensor. In response to determining that the front axle is lowered to a target height, the vehicle-mounted computer may control the disconnection (for example, closing the valve disposed on the air circuit between the air spring and the air tank) of the air circuit between the air spring and the above-described air storage tank to complete the height adjustment.

It may be seen that in the present implementation, the spring air pressure of the above-described air spring and the air tank air pressure of the above-described air storage tank are obtained; and in response to determining that the above-described spring air pressure and the above-described air tank air pressure meet the preset condition, the height of the axle corresponding to the above-described air spring in the above-described vehicle is adjusted by controlling the connection or disconnection of the air circuit between the above-described air spring and the above-described air storage tank. That is to say, in the case that the spring air pressure and the air tank air pressure meet the preset condition, the vehicle may change a spring air volume in the air spring by utilizing the pressure difference between the air spring and the air storage tank and controlling the connection or disconnection of the air circuit between the above-described air spring and the above-described air storage tank. When the spring air volume in the air spring changes, the corresponding axle height is also changed, so that height adjustment of the corresponding axle in the vehicle can be realized without using the compressor in the air suspension system, the use frequency of the compressor is reduced, and the service life of the air suspension system is prolonged.

Figure 2:
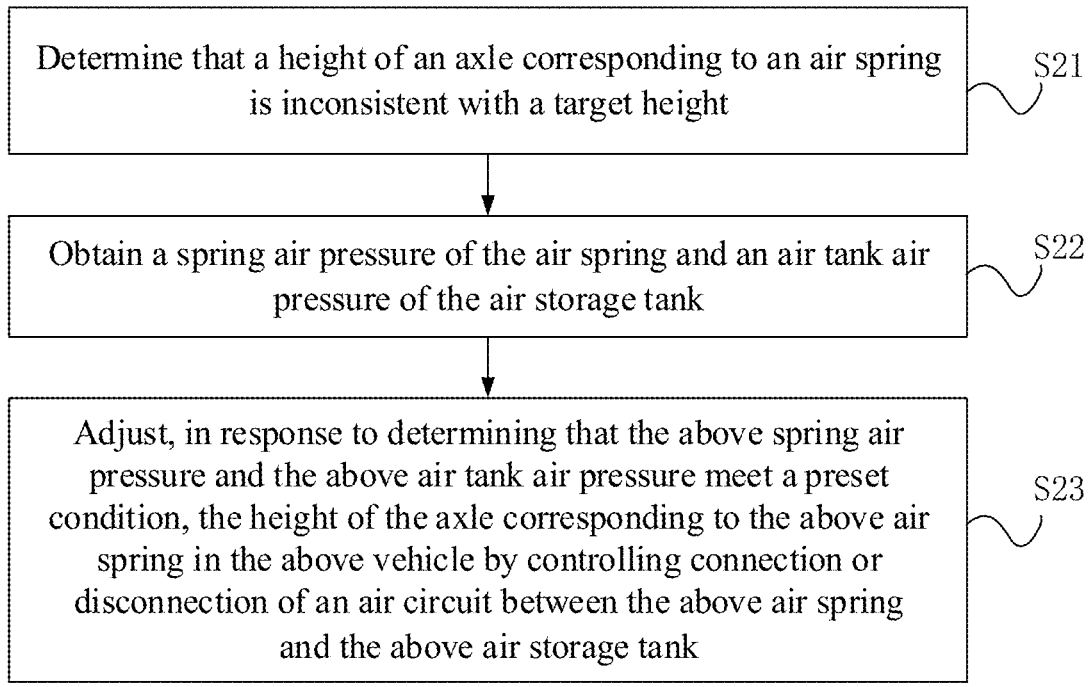
FIG. 2 is a flow diagram of a vehicle control method shown according to another example.

FIG. 2 is a flow diagram of a vehicle control method shown according to another example. As shown in FIG. 2, the method is used in a vehicle, and the vehicle control method may include the following steps:

In step S21, it is determined that a height of an axle corresponding to an air spring is inconsistent with a target height.

Optionally, the target height may be a height input by a user to a vehicle-mounted computer (for example, the user may input a height value a of a front axle through a mobile terminal in communication connection with the vehicle-mounted computer or a touch screen of the vehicle-mounted computer, and then the height a may be determined as the target height), or may be a height determined by the vehicle-mounted computer according to a current driving mode of the vehicle (for example, the current driving mode of the vehicle is a comfort mode, the comfort mode corresponds to a height value b of the height of the front axle of the vehicle in advance, and then the height b may be determined as the target height).

For example, taking the two air springs (hereinafter referred to as front axle air springs) at the two ends of the front axle of the vehicle as an example, a vehicle-mounted terminal may receive the height of the front axle collected and uploaded by a height sensor disposed on the front axle, and then determine, by comparing the height of the front axle with the target height, whether the height of the front axle is consistent with the target height. If no, it indicates that the height of the front axle of the vehicle needs to be adjusted, and the vehicle-mounted computer may execute an operation of the subsequent step S22. If yes, it indicates that the height of the front axle of the vehicle does not need to be adjusted, and no processing is made.

In step S22, a spring air pressure of the above-described air spring and an air tank air pressure of the above-described air storage tank are obtained.

For a specific implementation of step S22, reference may be made to step S11, which is not repeated here.

In step S23, in response to determining that the above-described spring air pressure and the above-described air tank air pressure meet a preset condition, a height of an axle corresponding to the above-described air spring in the above-described vehicle is adjusted by controlling connection or disconnection of the air circuit between the above-described air spring and the above-described air storage tank.

In some implementations, the vehicle control method may further include:

it is determined that the above-described spring air pressure and the above-described air tank air pressure meet the preset condition in response to determining that an air pressure difference value between the above-described spring air pressure and the above-described air tank air pressure is greater than or equal to an air pressure threshold.

For example, the air tank air pressure of the air storage tank is $P_{Tank}$, the air spring is a rear axle air spring of the vehicle, a spring air pressure of the rear axle air spring is $P_R$, and the air pressure threshold is $\Delta P$. If $P_R - P_{Tank} \geq \Delta P$, it may be determined that the spring air pressure and the above-described air tank air pressure meet the preset condition.

Similarly, whether the spring air pressure of the front axle air spring of the vehicle and the air tank air pressure meet the preset condition may also be judged by the above manner.

Considering that when the pressure difference between the air spring and the air tank is not enough, the axle corresponding to the air spring cannot be adjusted to the target height. For example, when gas between the air spring and the air storage tank is balanced, there is also a certain gap between the height of the axle corresponding to the air spring and the target height. In the present implementation, the air pressure difference value between the above-described spring air pressure and the above-described air tank air pressure is greater than or equal to the air pressure threshold, then it is determined that the above-described spring air pressure and the above-described air tank air pressure meet the preset condition, and thus it may be ensured that the height of the axle corresponding to the above-described air spring in the vehicle can be stably adjusted.

As an implementation, the method may further include a manner of determining the air pressure threshold, and the manner of determining the air pressure threshold may include:

an initial height of the axle corresponding to the above-described air spring is obtained; and the above-described air pressure threshold is determined according to the above-described initial height and the target height.

For example, taking the rear axle air spring of the vehicle as an example, the vehicle-mounted computer may detect an initial height of a rear axle of the vehicle through the height sensor, then calculate a height difference value between the initial height and the target height, determine the height difference value as a height variation $\Delta h$ that needs to be adjusted for the rear axle, and then calculate the air pressure threshold according to the height variation $\Delta h$.

Optionally, after the height variation $\Delta h$ is determined, a volume variation $\Delta V$ of the air spring may be calculated through the following formula:

$$\Delta V = A \cdot \Delta h$$

After the volume variation $\Delta V$ of the air spring is determined, an air volume variation $\Delta M$ of the air spring may be calculated through the following formula:

$$\Delta M = P \cdot \Delta V$$

where, P is the spring air pressure of the air spring.

After the air volume variation $\Delta M$ is determined, an air tank pressure $P_{Tank\_Rear}$ of the air storage tank after the height of the rear axle is adjusted may be calculated through the following formula:

$$P_{Tank\_Rear} = \frac{P_{Tank\_Initial} \cdot V_{Tank} + 2 * \Delta M_R}{V_{Tank}}$$

where, $V_{Tank}$ is an air tank volume of the air storage tank. $P_{Tank\_Initial}$ is an initial air tank air pressure of the air storage tank before height adjustment of the rear axle.

Then, a difference value of $P_{Tank\_Initial} - P_{Tank\_Rear}$ is determined as the air pressure threshold $\Delta P$.

Optionally, following the above example, it is assumed that the air spring includes the front axle air spring and the rear axle air spring, the spring air pressure $P_R$ of the rear axle air spring is less than the spring air pressure $P_F$ of the front axle air spring, and the vehicle-mounted computer needs to adjust the vehicle height of the vehicle, that is, the height of both the rear axle and the front axle needs to be adjusted. In a case of adjusting the height of the rear axle first, in order to ensure that height adjustment of the entire vehicle can be completed, the initial air tank air pressure $P_{Tank\_Initial}$ before height adjustment of the rear axle, the air tank air pressure $P_{Tank\_Rear}$ after height adjustment of the rear axle, the spring air pressure $P_R$ of the rear axle air spring, and the spring air pressure $P_F$ of the front axle air spring may be made to meet the following relationship:

$$P_{Tank\_Initial} = P_R - \Delta P$$

$$P_F - P_{Tank\_Rear} > \Delta P$$

It may be understood that the target height corresponding to each air spring in the plurality of air springs may be the same or different, which may be specifically set according to actual requirements and is not limited here.

Figure 7:
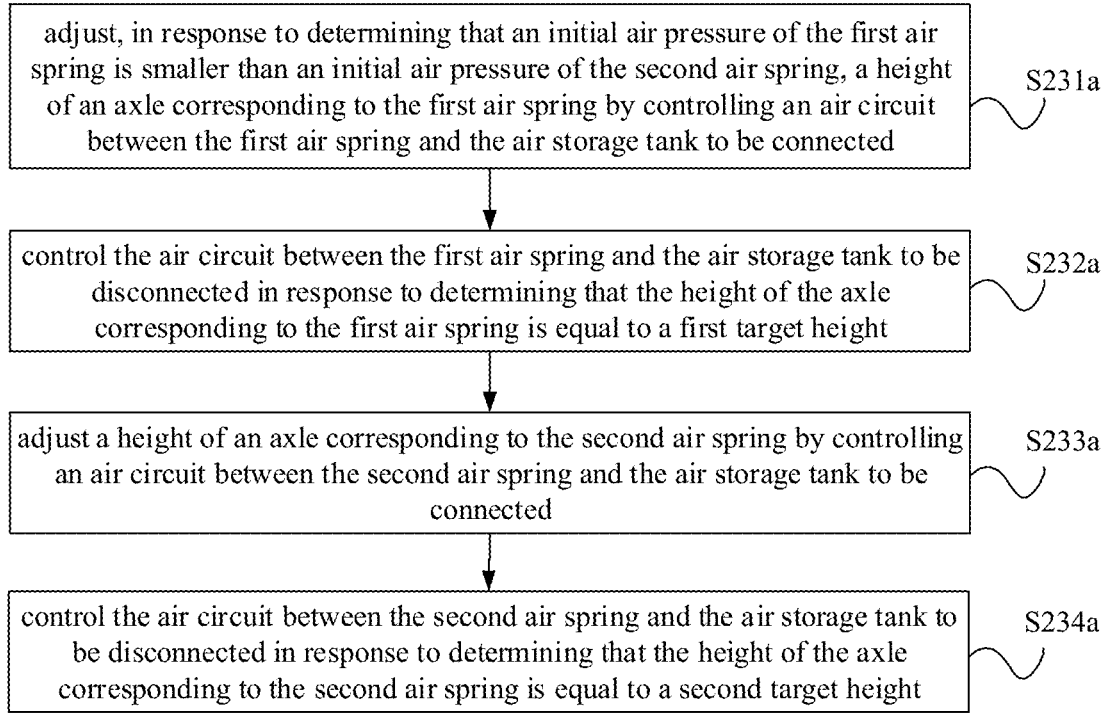
FIG. 7 is a flow diagram of step S23 in the vehicle control method shown according to an example.

In some implementations, the above-described air spring includes a first air spring and a second air spring. In response to determining that the first air spring is the front axle air spring, the second air spring is the rear axle air spring, and in response to determining that the second air spring is the front axle air spring, the first air spring is the rear axle air spring. The specific implementation of step S23 may include steps S231a~S234a, as shown in FIG.7.

In Step S231a, in response to determining that an initial air pressure of the above-described first air spring is smaller than an initial air pressure of the above-described second air spring, a height of an axle corresponding to the above-described first air spring is adjusted by controlling an air circuit between the above-described first air spring and the above-described air storage tank to be connected.

For example, the initial air pressure of the first air spring is P1, and the initial air pressure of the above-described second air spring is P2. In response to determining that the vehicle-mounted computer detects that P1<P2, the air circuit between the above-described first air spring and the above-described air storage tank may be controlled to be connected, so that gas exchange is performed between the first air spring and the air storage tank.

In Step S232a, the air circuit between the above-described first air spring and the above-described air storage tank is controlled to be disconnected in response to determining that the height of the axle corresponding to the above-described first air spring is equal to a first target height.

Following the above example, in a process of gas exchange between the first air spring and the air storage tank, the vehicle-mounted computer detects the height of the axle corresponding to the first air spring in real time through the height sensor. In response to determining that the height of the axle corresponding to the first air spring is equal to the first target height, it indicates that the height of the axle corresponding to the first air spring has been adjusted, and the air circuit between the above-described first air spring and the above-described air storage tank may be controlled to be disconnected.

In Step S233a, a height of an axle corresponding to the above-described second air spring is adjusted by controlling the air circuit between the above-described second air spring and the above-described air storage tank to be connected.

Following the above example, the vehicle-mounted computer may control the air circuit between the above-described second air spring and the above-described air storage tank to be connected, and detect the height of the axle corresponding to the second air spring in real time.

In Step S234a, the air circuit between the above-described second air spring and the above-described air storage tank is controlled to be disconnected in response to determining that the height of the axle corresponding to the above-described second air spring is equal to a second target height.

Following the above example, in response to determining that the vehicle-mounted computer detects that the height of the axle corresponding to the second air spring is equal to the second target height, it indicates that the height of the axle corresponding to the second air spring has been adjusted, and the air circuit between the above-described second air spring and the above-described air storage tank is controlled to be disconnected.

Figure 3:
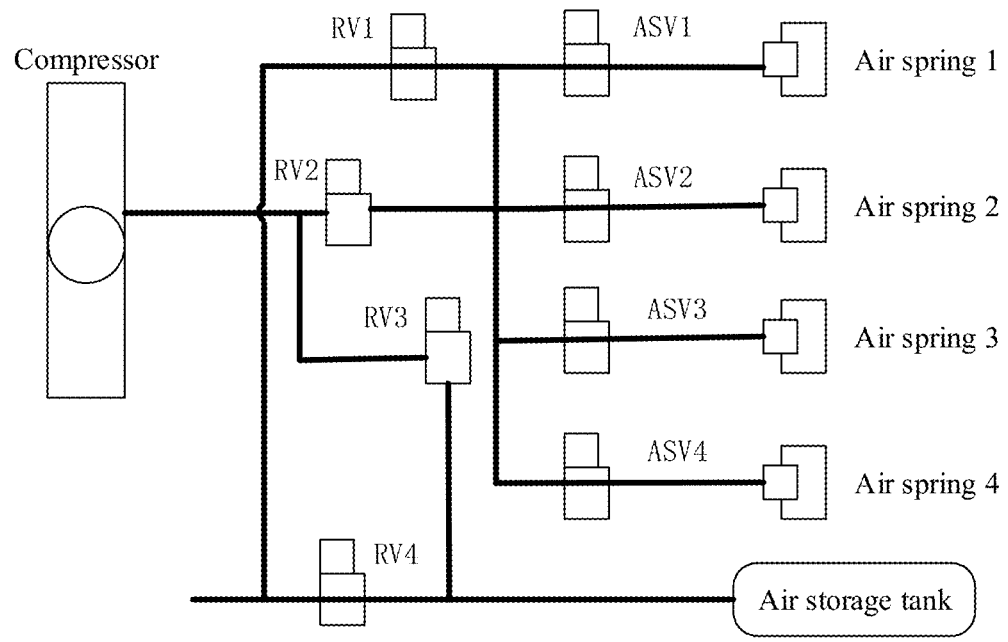
FIG. 3 is a schematic diagram of an air circuit of an air suspension shown according to an example of FIG. 2.

A more specific example is shown in FIG. 3. FIG. 3 shows a schematic diagram of the air circuit of an air suspension in the present example, in which the air spring 1 and the air spring 2 are the front axle air springs of the front axle of the vehicle, and the air spring 3 and the air spring 4 are the rear axle air springs of the rear axle of the vehicle. The vehicle control method of the present example is illustrated below with reference to FIG. 3. The vehicle control method may include:

step 1, air spring valves ASV3 and ASV4 are opened, and the spring air pressure $P_{Measure\_Rear}$ of the rear axle air spring is detected;

step 2, the air spring valves ASV3 and ASV4 are closed, switching valves RV1 and RV4 are opened, and the air tank air pressure $P_{Measure\_Tank}$ of the air storage tank is detected;

step 3, $P_{Measure\_Rear}$ and $P_{Measure\_Tank}$ are compared by using an ECU, in response to determining that $P_{Measure\_Rear} - P_{Measure\_Tank} > \Delta P$, the air spring valves ASV3 and ASV4 are opened to realize gas flow between the rear axle air spring and the air storage tank (also called gas exchange);

step 4, the height of the rear axle of the vehicle is read through the height sensor, and after the height of the rear axle reaches the target height, the air spring valves ASV3 and ASV4 are closed;

step 5, the air tank pressure $P'_{Measure\_Tank}$ is read by using the pressure sensor, and the switching valves RV1 and RV4 are closed;

step 6, air spring valves ASV1 and ASV2 are opened, and the front air spring pressure $P_{Measure\_Front}$ is detected;

step 7, $P_{Measure\_Front}$ and $P'_{Measure\_Tank}$ are compared by using the ECU, in response to determining that $P_{Measure\_Front} - P'_{Measure\_Tank} > \Delta P$, the switching valves RV1 and RV4 are opened to realize the gas flow between the front air spring and the air tank;

step 8, the height of the front axle is read through the height sensor, and after a current axle height reaches the target height, the air spring valves ASV1 and ASV2 are closed;

step 9, switching valves RV2 and RV3 are opened to balance an air pressure in a valve body; and step 10, the switching valves RV1, RV2, RV3 and RV4 are closed, and an ASU (Air Supply Unit) enters into a standby state.

Considering that the spring air pressure of the air spring is usually greater than the air tank air pressure in the air tank, the smaller the pressure difference between the air spring with the smaller spring air pressure and the air storage tank, the smaller the air variation in the air storage tank during height adjustment. In the present example, in a case that the plurality of air springs need to exchange gas with the air storage tank, gas exchange is preferentially performed on the air spring with the smaller air pressure, which can effectively reduce duration of the gas exchange of the entire height adjustment process, and thus improve height adjustment efficiency.

Figure 8:
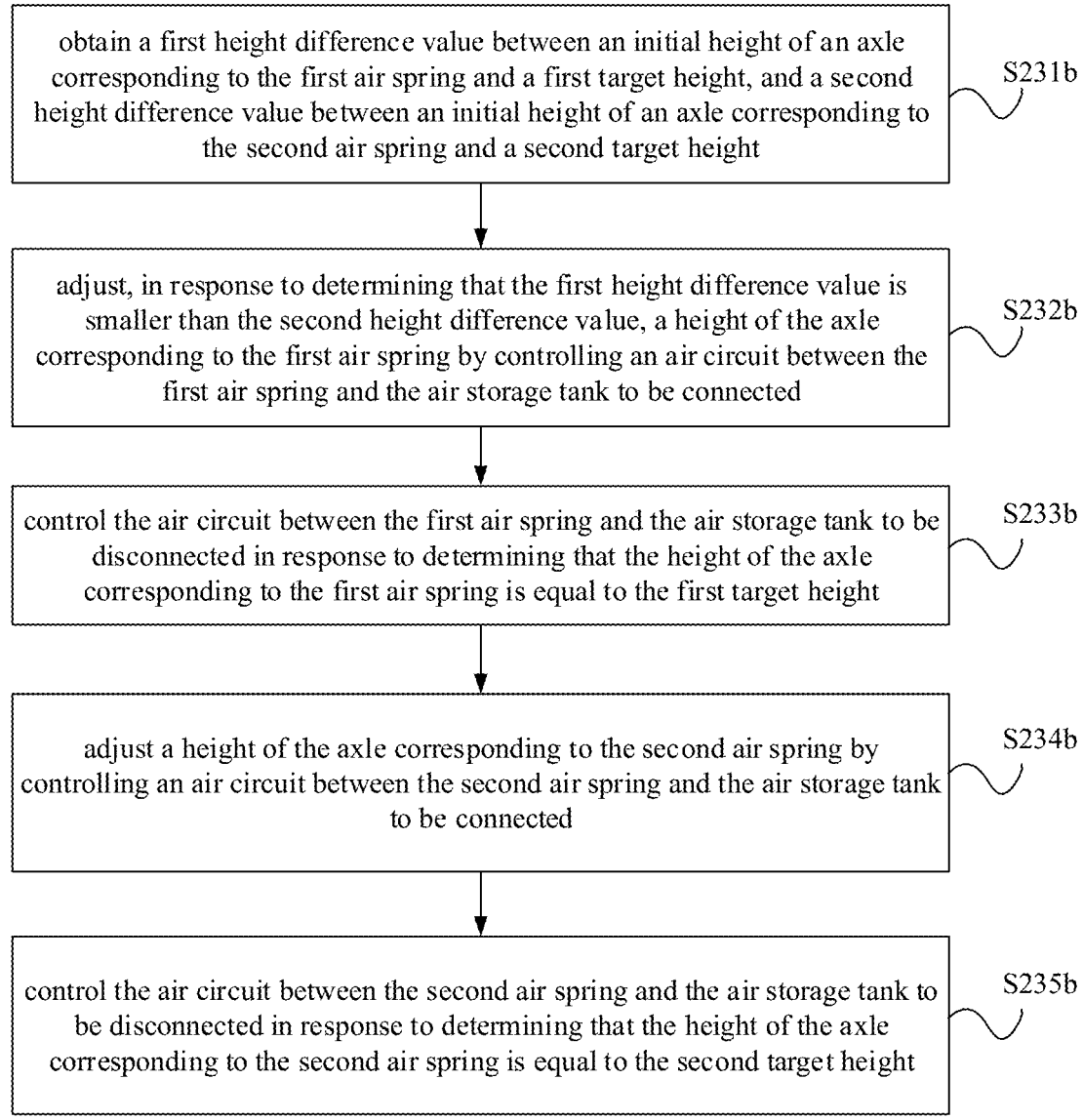
FIG. 8 is a flow diagram of step S23 in the vehicle control method shown according to another example.

In some other examples, the above-described air spring includes a first air spring and a second air spring, and a specific implementation of step S23 may include steps S231b~S235b, as shown in FIG. 8.

In Step S231b, a first height difference value between an initial height of an axle corresponding to the above-described first air spring and a first target height, and a second height difference value between an initial height of an axle corresponding to the above-described second air spring and a second target height are obtained;

In Step S232b, in response to determining that the above-described first height difference value is smaller than the above-described second height difference value, the height of the axle corresponding to the above-described first air spring is adjusted by controlling an air circuit between the above-described first air spring and the above-described air storage tank to be connected;

In Step S233b, the air circuit between the above-described first air spring and the above-described air storage tank is controlled to be disconnected in response to determining that the height of the axle corresponding to the above-described first air spring is equal to the above-described first target height;

In Step S234b, a height of an axle corresponding to the above-described second air spring is adjusted by controlling the air circuit between the above-described second air spring and the above-described air storage tank to be connected; and In Step S235b, the air circuit between the above-described second air spring and the above-described air storage tank is controlled to be disconnected in response to determining that the height of the axle corresponding to the above-described second air spring is equal to the above-described second target height.

Considering that when the height of the axle is adjusted through the air storage tank, the air volume of the air storage tank needs to be in a roughly stable range. And, the larger the height variation that needs to be adjusted, the more the gas exchange volume that needs to be exchanged for the air spring corresponding to the axle. If the height adjustment is performed first on the axle with a large height adjustment amount, the air storage volume in the air storage tank will change greatly. In that case, the height adjustment of the axle subsequently needing to be adjusted cannot be stably performed. This affects the height adjustment of the subsequent axle through the air storage tank. In the present implementation, by preferentially performing gas exchange between the air spring corresponding to the axle with a smaller height variation, and the air storage tank, it can be ensured that the height of the entire vehicle can be stably adjusted.

Figure 9:
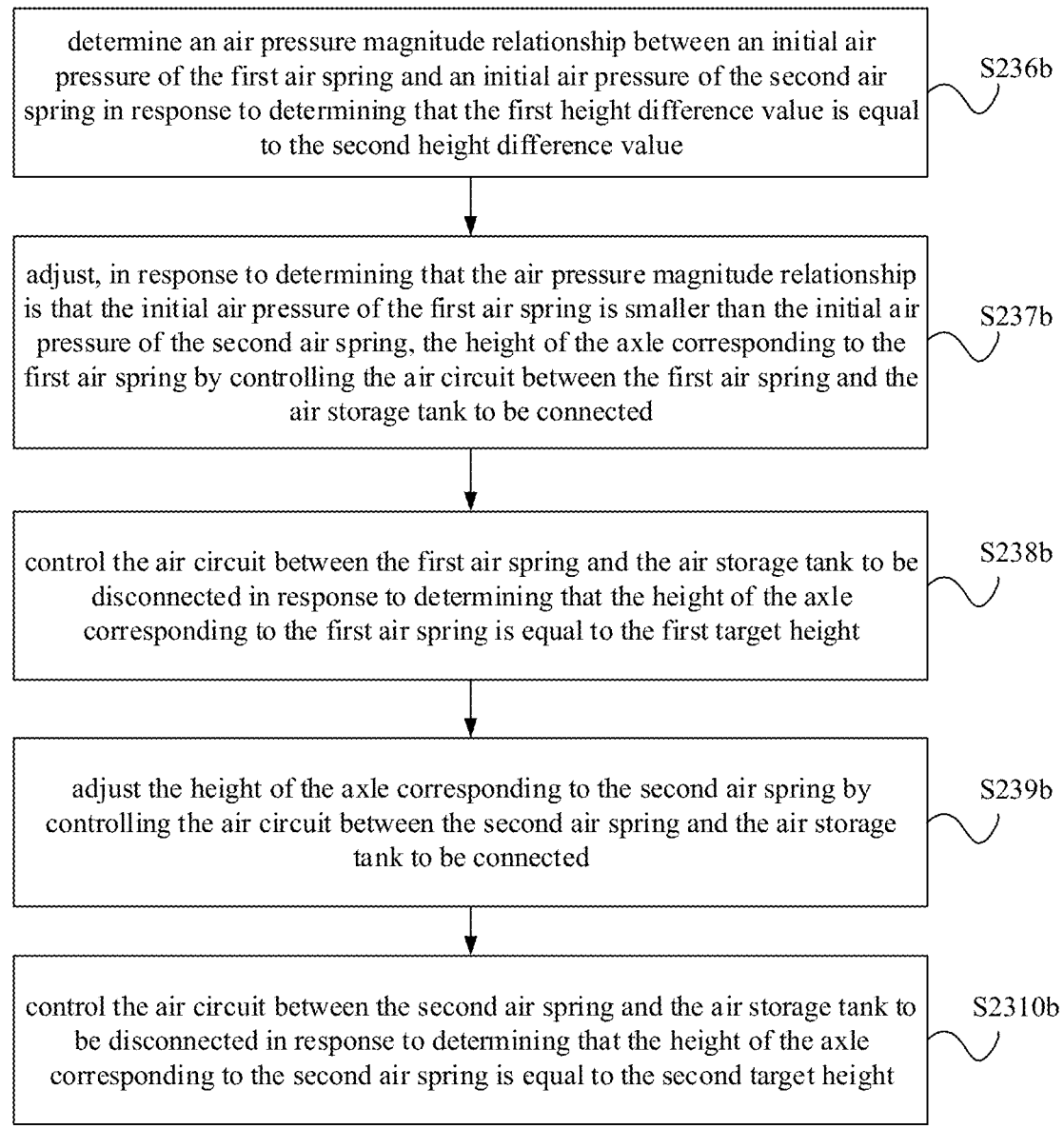
FIG. 9 is a flow diagram of step S23 in the vehicle control method shown according to yet another example.

As an implementation, step S23 may further include steps S236b~S2310b, as shown in FIG. 9.

In Step S236b, an air pressure magnitude relationship between the initial air pressure of the above-described first air spring and the initial air pressure of the above-described second air spring is determined in response to determining that the above-described first height difference value is equal to the above-described second height difference value;

In Step S237b, in response to determining that the above-described air pressure magnitude relationship is that the initial air pressure of the above-described first air spring is smaller than the initial air pressure of the above-described second air spring, the height of the axle corresponding to the above-described first air spring is adjusted by controlling the air circuit between the above-described first air spring and the above-described air storage tank to be connected;

In Step S238b, the air circuit between the above-described first air spring and the above-described air storage tank is controlled to be disconnected in response to determining that the height of the axle corresponding to the above-described first air spring is equal to a first target height;

In Step S239b, the height of an axle corresponding to the above-described second air spring is adjusted by controlling the air circuit between the above-described second air spring and the above-described air storage tank to be connected; and In Step S2310b, the air circuit between the above-described second air spring and the above-described air storage tank is controlled to be disconnected in response to determining that the height of the axle corresponding to the above-described second air spring is equal to a second target height.

It may be understood that in the present example, the air spring may refer to one of the four air springs of the vehicle, may also refer to the two air springs of the front axle of the vehicle, or the two air springs of the rear axle of the vehicle. Since the two air springs on the same axle have basically the same state during height adjustment, the two air springs of the same axle may be regarded as the corresponding air spring of the axle.

Figure 4:
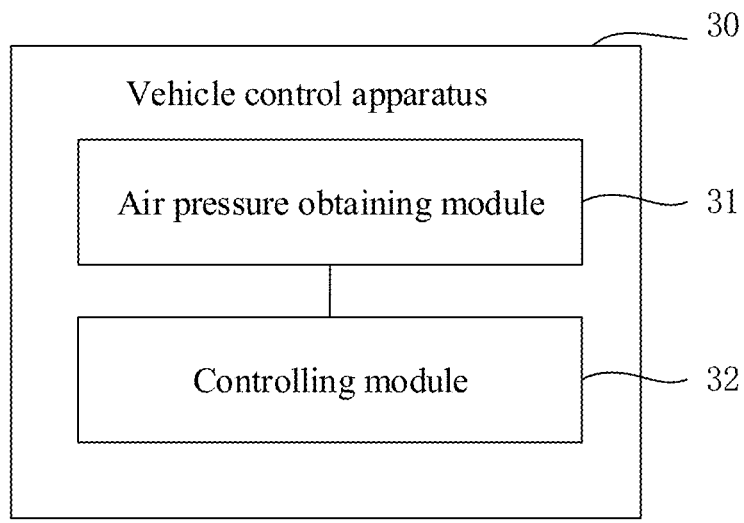
FIG. 4 is a block diagram of a vehicle control apparatus shown according to an example.

FIG. 4 is a block diagram of a vehicle control apparatus shown according to an example. Referring to FIG. 4, the apparatus 30 includes an air pressure obtaining module 31 and a controlling module 32.

The air pressure obtaining module 31 is configured to obtain a spring air pressure of the above-described air spring and an air tank air pressure of the above-described air storage tank.

The controlling module 32 is configured to adjust, in a case that the above-described spring air pressure and the above-described air tank air pressure meet a preset condition, a height of an axle corresponding to the above-described air spring in the above-described vehicle by controlling connection or disconnection of the air circuit between the above-described air spring and the above-described air storage tank.

In some implementations, the apparatus 30 further includes:
    a condition judging module, configured to determine that the above-described spring air pressure and the above-described air tank air pressure meet the preset condition in a case that an air pressure difference value between the above-described spring air pressure and the above-described air tank air pressure is greater than or equal to an air pressure threshold.

In some implementations, the condition judging module is specifically configured to obtain an initial height of the axle corresponding to the above-described air spring; and determine the above-described air pressure threshold according to the above-described initial height and the target height.

In some implementations, the above-described air spring includes a first air spring and a second air spring, and the controlling module 32 is specifically configured to:
    adjust, in a case that an initial air pressure of the above-described first air spring is smaller than an initial air pressure of the above-described second air spring, a height of an axle corresponding to the above-described first air spring by controlling an air circuit between the above-described first air spring and the above-described air storage tank to be connected;
    control the air circuit between the above-described first air spring and the above-described air storage tank to be disconnected in a case that the height of the axle corresponding to the above-described first air spring is equal to a first target height;

adjust a height of an axle corresponding to the above-described second air spring by controlling the air circuit between the above-described second air spring and the above-described air storage tank to be connected; and control the air circuit between the above-described second air spring and the above-described air storage tank to be disconnected in a case that the height of the axle corresponding to the above-described second air spring is equal to a second target height.

In some implementations, the above-described air spring includes a first air spring and a second air spring, and the controlling module 32 is specifically configured to:

obtain a first height difference value between an initial height of an axle corresponding to the above-described first air spring and a first target height, and a second height difference value between an initial height of an axle corresponding to the above-described second air spring and a second target height;

adjust, in a case that the above-described first height difference value is smaller than the above-described second height difference value, the height of the axle corresponding to the above-described first air spring by controlling an air circuit between the above-described first air spring and the above-described air storage tank to be connected;

control the air circuit between the above-described first air spring and the above-described air storage tank to be disconnected in a case that the height of the axle corresponding to the above-described first air spring is equal to the first target height;

adjust a height of an axle corresponding to the above-described second air spring by controlling the air circuit between the above-described second air spring and the above-described air storage tank to be connected; and control the air circuit between the above-described second air spring and the above-described air storage tank to be disconnected in a case that the height of the axle corresponding to the above-described second air spring is equal to the second target height.

In some implementations, the above-described air spring includes a first air spring and a second air spring, and the controlling module 32 is further specifically configured to:

determine an air pressure magnitude relationship between the initial air pressure of the above-described first air spring and the initial air pressure of the above-described second air spring in a case that the above-described first height difference value is equal to the above-described second height difference value;

adjust, in a case that the above-described air pressure magnitude relationship is that the initial air pressure of the above-described first air spring is smaller than the initial air pressure of the above-described second air spring, the height of the axle corresponding to the above-described first air spring by controlling the air circuit between the above-described first air spring and the above-described air storage tank to be connected;

control the air circuit between the above-described first air spring and the above-described air storage tank to be disconnected in a case that the height of the axle corresponding to the above-described first air spring is equal to the first target height;

adjust the height of the axle corresponding to the above-described second air spring by controlling the air circuit between the above-described second air spring and the above-described air storage tank to be connected; and control the air circuit between the above-described second air spring and the above-described air storage tank to be disconnected in a case that the height of the axle corresponding to the above-described second air spring is equal to the second target height.

In some implementations, the apparatus 30 further includes:

a height detecting module, configured to determine that the height of the axle corresponding to the air spring is inconsistent with the target height.

As for the apparatus in the above examples, the specific manners for executing operations by all modules have been described in the examples related to the method in detail, which is not illustrated in detail here.

The disclosure further provides a computer readable storage medium, storing a computer program instruction. The program instruction, in response to being executed by a processor, implements steps of the vehicle control method provided by the disclosure.

Figure 5:
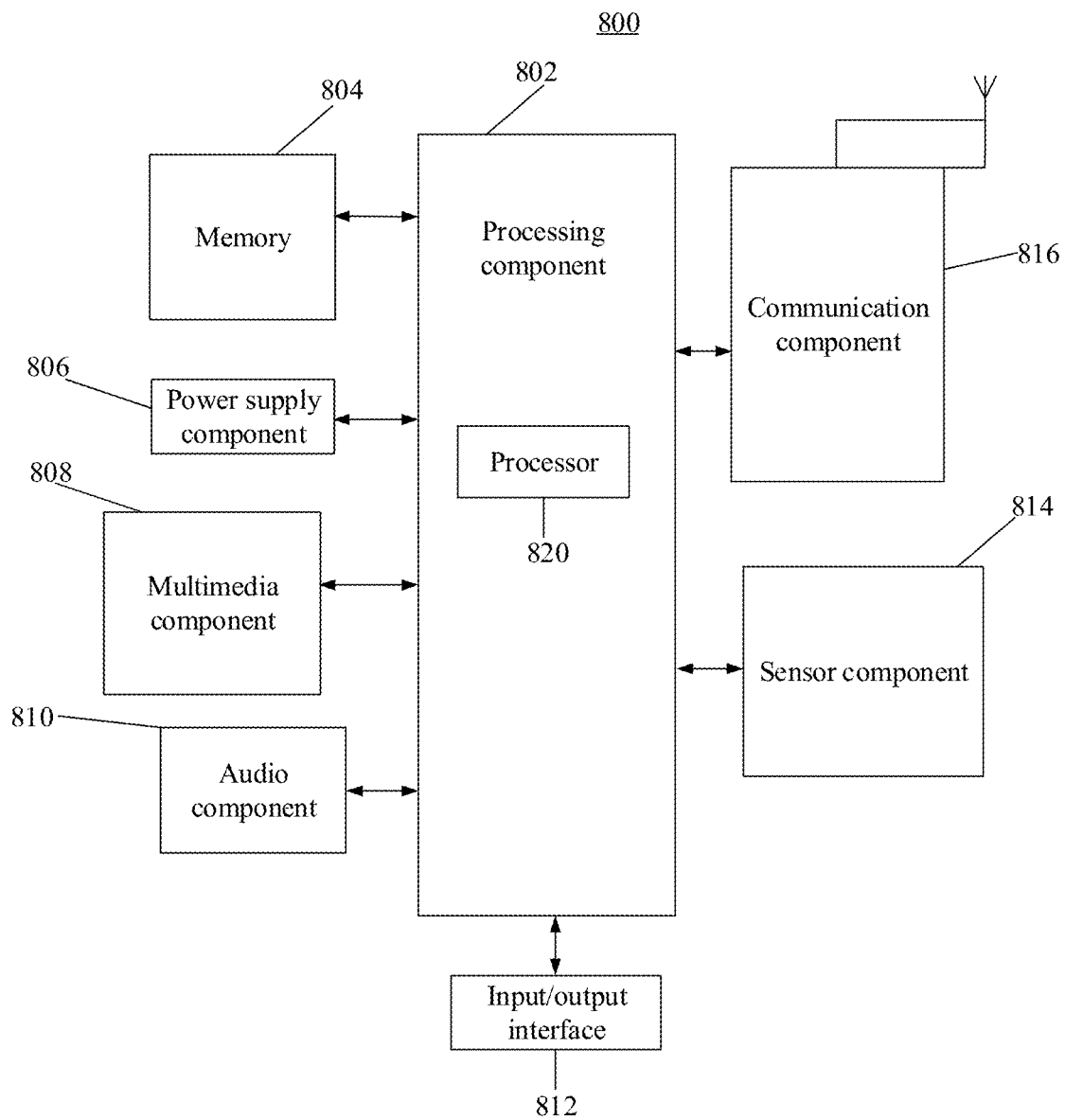
FIG. 5 is a block diagram of a vehicle-mounted computer shown according to an example.

FIG. 5 is a block diagram of a vehicle-mounted computer 800 for a vehicle control method shown according to an example.

Referring to FIG. 5, the vehicle-mounted computer 800 may include one or more of the following components: a processing component 802, a memory 804, a power supply component 806, a multimedia component 808, an audio component 810, an input/output (I/O) interface 812, a sensor component 814, and a communication component 816.

The processing component 802 usually controls overall operation of the vehicle-mounted computer 800, such as operations associated with displaying, telephone calling, data communication, a camera operation and a record operation. The processing component 802 may include one or more processors 820 to execute an instruction, so as to complete all or part of steps of the above method. In addition, the processing component 802 may include one or more modules, so as to facilitate interaction between the processing component 802 and other components. For example, the processing component 802 may include a multimedia module, so as to facilitate interaction between the multimedia component 808 and the processing component 802.

The memory 804 is configured to store various types of data so as to support operations on the vehicle-mounted computer 800. Examples of these data include instructions of any application program or method configured to be operated on the vehicle-mounted computer 800, contact data, telephone directory data, messages, pictures, videos, and the like. The memory 804 may be implemented by any type of volatile or nonvolatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 806 provides electric power for various components of the vehicle-mounted computer 800. The power supply component 806 may include a power management system, one or more power sources, and other components associated with generating, managing and distributing electric power for the vehicle-mounted computer 800.

The multimedia component 808 includes a screen providing an output interface between the vehicle-mounted computer 800 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors to sense touching, swiping and gestures on the touch panel. The touch sensor may not only sense a boundary of a touching or swiping action, but also detect duration and pressure related to the touching or swiping operation. In some examples, the multimedia component 808 includes a front camera and/or a back camera. When the vehicle-mounted computer 800 is in an operation mode, such as a shooting mode or a video mode, the front camera and/or the back camera may receive external multimedia data. Each front camera and each back camera may be a fixed optical lens system or have a focal length and optical zooming capability.

The audio component 810 is configured to output and/or input an audio signal. For example, the audio component 810 includes a microphone (MIC). When the vehicle-mounted computer 800 is in the operation mode, such as a call mode, a recording mode or a speech recognition mode, the microphone is configured to receive an external audio signal. The received audio signal may be further stored in the memory 804 or sent via the communication component 816. In some examples, the audio component 810 further includes a speaker for outputting an audio signal.

The input/output interface 812 provides an interface between the processing component 802 and a peripheral interface module, and the above peripheral interface module may be a keyboard, a click wheel, buttons, etc. These buttons may include but are not limited to: a home button, a volume button, a start button and a lock button.

The sensor component 814 includes one or more sensors for providing state evaluations of all aspects for the vehicle-mounted computer 800. For example, the sensor component 814 may detect an on/off state of the vehicle-mounted computer 800 and relative positioning of components, for example, the components are a display and a keypad of the vehicle-mounted computer 800. The sensor component 814 may further detect position change of the vehicle-mounted computer 800 or one component of the vehicle-mounted computer 800, whether there is contact between the user and the vehicle-mounted computer 800, and temperature change of the vehicle-mounted computer 800. The sensor component 814 may include a proximity sensor, and is configured to detect existence of a nearby object without any physical contact.

The communication component 816 is configured to facilitate wired or wireless communication between the vehicle-mounted computer 800 and other devices. The vehicle-mounted computer 800 may access into a wireless network based on a communication standard, such as WiFi, 2G or 3G, or their combination. In an example, the communication component 816 receives a broadcast signal or broadcast related information from an external broadcast management system via a broadcast channel. In an example, the communication component 816 further includes a near-field communication (NFC) module so as to facilitate short-range communication. For example, the NFC module may be implemented based on a radio frequency identification (RFID) technology, an infrared data association (IrDA) technology, an ultra wide band (UWB) technology, a Bluetooth (BT) technology and other technologies.

In the example, the vehicle-mounted computer 800 may be implemented by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements for executing the above method.

In the example, a non-temporary computer readable storage medium including an instruction is further provided, such as a memory 804 including an instruction. The above instruction may be executed by a processor 820 of the vehicle-mounted computer 800 so as to complete the above method. For example, the non-temporary computer readable storage medium may be an ROM, a random access memory (RAM), a CD-ROM, a magnetic tape, a floppy disk, an optical data storage device and the like.

In addition to being an independent electronic device, the above vehicle-mounted computer may also be a part of an independent electronic device. For example, in one example, the vehicle-mounted computer may be an integrated circuit (IC) or a chip, in which the integrated circuit may be one IC, or a collection of the plurality of ICs. The chip may include but is not limited to the following types: a graphics processing unit (GPU), a central processing unit (CPU), a field programmable gate array (FPGA), a digital signal processor (DSP), an application specific integrated circuit (ASIC), a system on chip (SoC), etc. The above integrated circuit or chip can be used to execute an executable instruction (or a code) to implement the above vehicle control method. The executable instruction may be stored in the integrated circuit or the chip, or may be obtained from other apparatuses or devices. For example, the integrated circuit or the chip includes a processor, a memory, and an interface for communicating with other apparatuses. The executable instruction may be stored in the processor, and the above vehicle control method may be implemented when the executable instruction is executed by the processor; or, the integrated circuit or the chip may receive the executable instruction through the interface and transmit it to the processor for executing, so as to implement the above vehicle control method.

Figure 6:
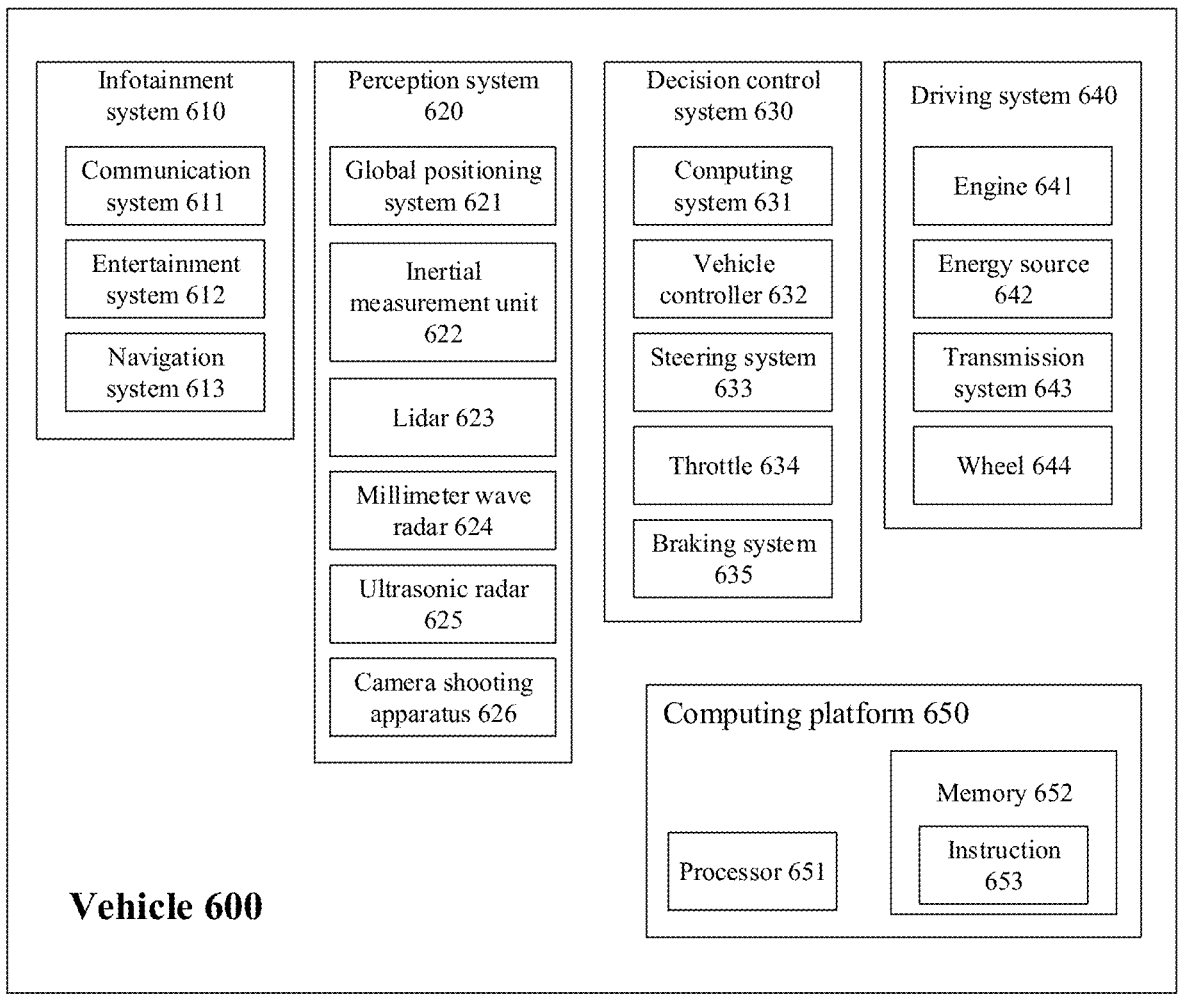
FIG. 6 is a schematic functional block diagram of a vehicle shown according to an example.

Referring to FIG. 6, FIG. 6 is a schematic functional block diagram of a vehicle 600 shown according to an example. The vehicle 600 may be configured in a fully or partially automatic driving mode. For example, the vehicle 600 may obtain surrounding environment information through a perception system 620, and obtain an automatic driving strategy based on analysis of the surrounding environment information to realize fully automatic driving, or present an analysis result to a user to realize partial automatic driving.

The vehicle 600 may include various subsystems, such as an infotainment system 610, a perception system 620, a decision control system 630, a driving system 640, and a computing platform 650. Optionally, the vehicle 600 may include more or less subsystems, and each subsystem may include a plurality of parts. Additionally, each of the subsystems and parts of the vehicle 600 may be interconnected in a wired or wireless manner.

In some examples, the infotainment system 610 may include a communication system 611, an entertainment system 612, and a navigation system 613.

The communication system 611 may include a wireless communication system, and the wireless communication system may wirelessly communicate with one or more devices, either directly or via a communication network. For example, the wireless communication system may use 3G cellular communication such as CDMA, EVDO, GSM/GPRS, or 4G cellular communication such as LTE, or 5G cellular communication. The wireless communication system may communicate with a wireless local area network (WLAN) by using WiFi. In some examples, the wireless communication system may communicate directly with the device by using an infrared link, Bluetooth, or ZigBee. Other wireless protocols, such as various vehicle communication systems, for example, the wireless communication system may include one or more dedicated short range communications (DSRC) devices, and these devices may include public and/or private data communications between the vehicle and/or a roadside station.

The entertainment system 612 may include a display device, a microphone and a speaker, and a user may listen to radio and play music in the vehicle based on the entertainment system; or a mobile phone is connected with the vehicle to realize screen projection of the mobile phone on the display device. The display device may be a touch-type display device, and the user may operate by touching a screen.

In some cases, a speech signal of the user may be obtained through the microphone, and some controls on the vehicle 600 by the user, such as adjusting a temperature in the vehicle, may be implemented according to the analysis of the speech signal of the user. In some other cases, the music may be played to the user through the speaker.

The navigation system 613 may include a map service provided by a map provider, so as to provide navigation of a driving route for the vehicle 600. The navigation system 613 may cooperate with a global positioning system 621 and an inertial measurement unit 622 of the vehicle for use. The map service provided by the map provider may be a two-dimensional map or a high-precision map.

The perception system 620 may include several types of sensors that sense information about surrounding environment of the vehicle 600. For example, the perception system 620 may include a global positioning system 621 (the global positioning system may be a GPS system, a Beidou system or other positioning systems), the inertial measurement unit (IMU) 622, a lidar 623, a millimeter wave radar 624, an ultrasonic radar 625 and a camera shooting apparatus 626. The perception system 620 may further include sensors of an internal system of the monitored vehicle 600 (for example, an in-vehicle air quality monitor, a fuel gauge, an oil temperature gauge, etc.). Sensor data from one or more of these sensors may be used to detect an object and its corresponding properties (a position, a shape, orientation, a speed, etc.). This detection and identification is a key function for a safe operation of the vehicle 600.

The global positioning system 621 is used to estimate a geographic location of the vehicle 600.

The inertial measurement unit 622 is used to sense a pose change of the vehicle 600 based on inertial acceleration. In some examples, the inertial measurement unit 622 may be a combination of an accelerometer and a gyroscope.

The lidar 623 uses laser light to sense objects in an environment where the vehicle 600 is located. In some examples, the lidar 623 may include one or more laser sources, laser scanners, one or more detectors, and other system components.

The millimeter wave radar 624 uses a radio signal to sense the objects within the surrounding environment of the vehicle 600. In some examples, in addition to sensing the objects, the millimeter wave radar 624 may further be used to sense a speed and/or heading direction of the objects.

The ultrasonic radar 625 may sense the objects around the vehicle 600 by using an ultrasonic signal.

The camera shooting apparatus 626 is used to capture image information of the surrounding environment of the vehicle 600. The camera shooting apparatus 626 may include a monocular camera, a binocular camera, a structured light camera, a panoramic camera, etc., and the image information obtained by the camera shooting apparatus 626 may include a static image or video stream information.

The decision control system 630 includes a computing system 631 for analyzing and making decisions based on the information obtained by the perception system 620, and the decision control system 630 further includes a vehicle controller 632 for controlling a power system of the vehicle 600, and a steering system 633, a throttle 634 and a braking system 635 for controlling the vehicle 600.

The computing system 631 is operable to process and analyze various information obtained by the perception system 620, so as to identify a target, the objects and/or features in the surrounding environment of the vehicle 600. The target may include pedestrians or animals, and the objects and/or features may include a traffic signal, a road boundary, and an obstacle. The computing system 631 may use technologies such as an object identification algorithm, a Structure from Motion (SFM) algorithm, and video tracking. In some examples, the computing system 631 may be used to draw a map for the environment, track the objects, estimate the speed of the objects, and the like. The computing system 631 may analyze various obtained information and derive a control strategy for the vehicle.

The vehicle controller 632 may be used to coordinately control a power battery and an engine 641 of the vehicle to improve power performance of the vehicle 600.

The steering system 633 is operable to adjust the heading direction of the vehicle 600. For example, in one example, it may be a steering wheel system.

The throttle 634 is used to control an operating speed of the engine 641 and thus control the speed of the vehicle 600.

The braking system 635 is used to control the vehicle 600 to decelerate. The braking system 635 may use frictional force to slow wheels 644. In some examples, the braking system 635 may convert kinetic energy of the wheels 644 into electrical current. The braking system 635 may also take other forms to slow a rotational speed of the wheels 644 so as to control the speed of the vehicle 600.

The driving system 640 may include components that provide powered motion for the vehicle 600. In one example, the driving system 640 may include the engine 641, an energy source 642, a transmission system 643, and the wheels 644. The engine 641 may be an internal combustion engine, an electric motor, an air compression engine, or other types of engine combinations, such as a hybrid engine composed of a gasoline engine and the electric motor, and a hybrid engine composed of an internal combustion engine and an air compression engine. The engine 641 converts the energy source 642 into mechanical energy.

Examples of the energy source 642 include gasoline, diesel, other petroleum-based fuels, propane, other compressed gas-based fuels, ethanol, a solar cell panel, a battery, and other sources of electricity. The energy source 642 may also provide energy to other systems of the vehicle 600.

The transmission system 643 may transmit mechanical power from the engine 641 to the wheels 644. The transmission system 643 may include a gearbox, a differential, and a drive shaft. In one example, the transmission system 643 may further include other devices, such as a clutch. The drive shaft may include one or more axles that may be coupled to the one or more wheels 644.

Some or all of the functions of the vehicle 600 are controlled by the computing platform 650. The computing platform 650 may include at least one processor 651, and the processor 651 may execute instructions 653 stored in a non-transitory computer-readable medium such as a memory 652. In some examples, the computing platform

650 may further be a plurality of computing devices that control individual components or subsystems of the vehicle 600 in a distributed manner.

The processor 651 may be any conventional processor, such as a commercially available CPU. Alternatively, the processor 651 may further include, for example, a graphic process unit (GPU), a field programmable gate array (FPGA), a system on a chip (SOC), an application specific integrated chip (ASIC) or their combination. Although FIG. 6 functionally illustrates the processor, the memory, and other elements of a computer in the same block, those skilled in the art should understand that the processor, the computer, or the memory may actually include the plurality of processors, computers or memories that may or may not be stored within the same physical enclosure. For example, the memory may be a hard drive or other storage medium located within an enclosure other than the computer. Thus, reference to the processor or computer will be understood to include reference to a collection of the processors or computers or memories that may or may not operate in parallel. Different from using a single processor to execute the steps described here, some components, such as a steering component and a deceleration component, may each have their own processor, and the processor merely execute computations related to component-specific functions. The computing platform 650 may be equivalent to the vehicle-mounted computer in the above example.

In the implementation of the disclosure, the processor 651 may execute the above vehicle control method.

In various aspects described here, the processor 651 may be located away from the vehicle and in wireless communication with the vehicle. In other aspects, some of the processes described herein are executed on a processor disposed within the vehicle, while others are executed by a remote processor, including taking steps indispensable to execute single maneuver.

In some examples, the memory 652 may contain an instruction 653 (for example, program logic), and the instruction 653 may be executed by the processor 651 to execute various functions of the vehicle 600. The memory 652 may also contain an additional instruction, including an instruction for sending data to, receiving data from, interacting with, and/or controlling one or more of the infotainment system 610, the perception system 620, the decision control system 630, and the driving system 640.

In addition to the instruction 653, the memory 652 may further store data such as road maps, route information, vehicle locations, directions, speeds, and other such vehicle data, and other information. Such information may be used by the vehicle 600 and the computing platform 650 during operation of the vehicle 600 in autonomous, semi-autonomous, and/or manual modes.

The computing platform 650 may control the functions of the vehicle 600 based on inputs received from various subsystems (for example, the driving system 640, the perception system 620, and the decision control system 630). For example, the computing platform 650 may utilize input from the decision control system 630 in order to control the steering system 633 to avoid obstacles detected by the perception system 620. In some examples, the computing platform 650 is operable to provide control over many aspects of the vehicle 600 and its subsystems.

Optionally, one or more of these components above may be installed separately with the vehicle 600 or associated with the vehicle 600. For example, the memory 652 may exist partially or completely separate from the vehicle 600.

The above components may be communicatively coupled together in a wired and/or wireless manner.

Optionally, the above components are just an example. In practical application, components in all the above modules may be added or deleted according to actual needs, and FIG. 6 should not be construed as a limitation on the example of the disclosure.

An automatic driving car traveling on a road, such as the vehicle 600 above, may identify the objects within its surrounding environment to determine an adjustment to the current speed. The objects may be other vehicles, a traffic control device, or other types of objects. In some examples, each identified object may be considered independently, and based on the respective characteristics of the objects, such as its current speed, acceleration, and distance from the vehicle, may be used to determine the speed at which the automatic driving vehicle is to adjust.

Optionally, the vehicle 600 or perception and computing devices associated with the vehicle 600 (for example, the computing system 631 and the computing platform 650) may predict behavior of the identified objects based on the characteristics of the identified objects and the state of the surrounding environment (for example, traffic, rain, ice on the road, etc.). Optionally, each identified object depends on the behavior of the other, so it is also possible to predict the behavior of the single identified object by considering all the identified objects together. The vehicle 600 can adjust its speed based on the predicted behavior of the identified objects. In other words, the automatic driving car can determine what steady state the vehicle will need to adjust to (for example, accelerate, decelerate, or stop) based on the predicted behavior of the object. In this process, other factors may also be considered to determine the speed of the vehicle 600, such as a lateral location of the vehicle 600 in the road being traveled, a curvature of the road, and a proximity of static and dynamic objects.

In addition to providing the instruction to adjust the speed of the automatic driving car, the computing device may further provide the instruction to modify a steering angle of the vehicle 600, so that the automatic driving car follows a given trajectory and/or maintains a safe lateral and longitudinal distance from objects in the vicinity of the automatic driving car (for example, vehicles in adjacent lanes on the road).

The above vehicle 600 may comprise any of a variety of types of vehicles, such as a car, a truck, a motorcycle, a bus, a boat, an airplane, a helicopter, a recreational vehicle and a train, which are not particularly limited in the example of the disclosure.

In another example, a computer program product is further provided, containing a computer program executable by a programmable apparatus. The computer program has a code section for executing the above vehicle control method when executed by the programmable apparatus.

Those of skill in the art will easily figure out other implementation solutions of the disclosure after considering the specification and practicing the disclosure. The present disclosure intends to cover any transformation, usage or adaptive change of the disclosure, and these transformations, usages or adaptive changes conform to a general principle of the disclosure and include common general knowledge or conventional technical means in the technical field not disclosed by the disclosure. The specification and the examples are merely regarded as being for example, and the true scope and spirit of the disclosure are indicated by the following claims.

It should be understood that the disclosure is not limited to the exact structures that have been described above and shown in the accompanying drawings, and that various modifications and changes may be made without departing from the scope of the disclosure. The scope of the disclosure is limited merely by the appended claims.

What is claimed is:

1. A method for control of a vehicle, the method comprises:
   obtaining a spring air pressure of an air spring in an air suspension system of the vehicle, wherein the air spring comprises a first air spring and a second air spring;
   obtaining an air tank air pressure of an air storage tank in the air suspension system of the vehicle, wherein the air spring and the air storage tank are connected through an air circuit in the air suspension system of the vehicle and the spring air pressure of the air spring is greater than the air tank air pressure of the air storage tank; and
   adjusting, in response to determining that the spring air pressure and the air tank air pressure meet a preset condition, a height of the vehicle by controlling connection or disconnection of the air circuit between the air spring and the air storage tank, wherein the adjusting the height of the vehicle is performed by:
   adjusting, in response to determining that an initial air pressure of the first air spring is smaller than an initial air pressure of the second air spring, a height of a first axle corresponding to the first air spring by controlling the air circuit between the first air spring and the air storage tank to be connected,
   controlling the air circuit between the first air spring and the air storage tank to be disconnected in response to determining that the height of the first axle corresponding to the first air spring is equal to a first target height,
   adjusting a height of a second axle corresponding to the second air spring by controlling the air circuit between the second air spring and the air storage tank to be connected, and
   disconnecting the air circuit between the second air spring and the air storage tank in response to determining that the height of the second axle corresponding to the second air spring is equal to a second target height.

2. The method according to claim 1, further comprising:
   determining that the spring air pressure and the air tank air pressure meet the preset condition in response to determining that an air pressure difference value between the spring air pressure and the air tank air pressure is greater than or equal to an air pressure threshold.

3. The method according to claim 2, further comprising:
   obtaining an initial height of the first axle and the second axle; and
   determining the air pressure threshold according to the initial height and a target height.

4. The method according to claim 1, the method further comprising:
   obtaining a first height difference value between an initial height of the first axle corresponding to the first air spring and the first target height, and a second height difference value between the initial height of the second axle corresponding to the second air spring and the second target height;
   adjusting, in response to determining that the first height difference value is smaller than the second height difference value, the height of the first axle corresponding to the first air spring by controlling the air circuit between the first air spring and the air storage tank to be connected;
   disconnecting the air circuit between the first air spring and the air storage tank in response to determining that the height of the first axle corresponding to the first air spring is equal to the first target height;
   adjusting the height of the second axle corresponding to the second air spring by controlling the air circuit between the second air spring and the air storage tank to be connected; and
   disconnecting the air circuit between the second air spring and the air storage tank in response to determining that the height of the second axle corresponding to the second air spring is equal to the second target height.

5. The method according to claim 4, wherein adjusting the height of the vehicle by controlling the connection or disconnection of the air circuit between the air spring and the air storage tank further comprises:
   determining an air pressure magnitude relationship between an initial air pressure of the first air spring and an initial air pressure of the second air spring in response to determining that the first height difference value is equal to the second height difference value;
   adjusting, in response to determining that the air pressure magnitude relationship is that the initial air pressure of the first air spring is smaller than the initial air pressure of the second air spring, the height of the first axle corresponding to the first air spring by controlling the air circuit between the first air spring and the air storage tank to be connected;
   disconnecting the air circuit between the first air spring and the air storage tank in response to determining that the height of the first axle corresponding to the first air spring is equal to the first target height;
   adjusting the height of the second axle corresponding to the second air spring by controlling the air circuit between the second air spring and the air storage tank to be connected; and
   disconnecting the air circuit between the second air spring and the air storage tank in response to determining that the height of the second axle corresponding to the second air spring is equal to the second target height.

6. The method according to claim 1, wherein before adjusting, in response to determining that the spring air pressure and the air tank air pressure meet the preset condition, the height of the first axle by controlling the connection or disconnection of the air circuit between the air spring and the air storage tank, the method further comprises:
   determining that the height of the first axle or the second axle is inconsistent with a target height.

7. A chip, comprising a processor and an interface, wherein the processor is configured to execute the method according to claim 1 by reading an instruction.

8. A vehicle, comprising:
   an air spring in an air suspension system, wherein the air spring comprises a first air spring and a second air spring,
   an air storage tank in the air suspension system;
   an air circuit in the air suspension system that connects the air spring and the air storage tank;
   a processor; and
   a memory for storing an executable instruction of the processor; wherein the processor is configured to:
obtain a spring air pressure of the air spring and an air tank air pressure of the air storage tank, wherein the spring air pressure of the air spring is greater than the air tank air pressure of the air storage tank,
adjust, in response to determining that the spring air pressure and the air tank air pressure meet a preset condition, a height of the vehicle by controlling connection or disconnection of the air circuit between the air spring and the air storage tank,
adjust, in response to determining that an initial air pressure of the first air spring is smaller than an initial air pressure of the second air spring, a height of a first axle corresponding to the first air spring by controlling the air circuit between the first air spring and the air storage tank to be connected,
control the air circuit between the first air spring and the air storage tank to be disconnected in response to determining that the height of the first axle corresponding to the first air spring is equal to a first target height,
adjust a height of a second axle corresponding to the second air spring by controlling the air circuit between the second air spring and the air storage tank to be connected, and
disconnect the air circuit between the second air spring and the air storage tank in response to determining that the height of the second axle corresponding to the second air spring is equal to a second target height.

9. The vehicle according to claim 8, wherein the processor is further configured to:
determine that the spring air pressure and the air tank air pressure meet the preset condition in response to determining that an air pressure difference value between the spring air pressure and the air tank air pressure is greater than or equal to an air pressure threshold.

10. The vehicle according to claim 9, wherein the processor is further configured to:
obtain an initial height of the first axle and the second axle; and
determine the air pressure threshold according to the initial height and a target height.

11. The vehicle according to claim 8, wherein the processor is further configured to:
obtain a first height difference value between an initial height of the first axle corresponding to the first air spring and the first target height, and a second height difference value between an initial height of the second axle corresponding to the second air spring and the second target height;
adjust, in response to determining that the first height difference value is smaller than the second height difference value, the height of the first axle corresponding to the first air spring by controlling the air circuit between the first air spring and the air storage tank to be connected;
disconnect the air circuit between the first air spring and the air storage tank in response to determining that the height of the first axle corresponding to the first air spring is equal to the first target height;
adjust the height of the second axle corresponding to the second air spring by controlling the air circuit between the second air spring and the air storage tank to be connected; and
disconnect the air circuit between the second air spring and the air storage tank in response to determining that the height of the second axle corresponding to the second air spring is equal to the second target height.

12. The vehicle according to claim 11, wherein the processor is further configured to:
determine an air pressure magnitude relationship between an initial air pressure of the first air spring and an initial air pressure of the second air spring in response to determining that the first height difference value is equal to the second height difference value;
adjust, in response to determining that the air pressure magnitude relationship is that the initial air pressure of the first air spring is smaller than the initial air pressure of the second air spring, the height of the first axle corresponding to the first air spring by controlling the air circuit between the first air spring and the air storage tank to be connected;
disconnect the air circuit between the first air spring and the air storage tank in response to determining that the height of the first axle corresponding to the first air spring is equal to the first target height;
adjust the height of the second axle corresponding to the second air spring by controlling the air circuit between the second air spring and the air storage tank to be connected; and
disconnect the air circuit between the second air spring and the air storage tank in response to determining that the height of the second axle corresponding to the second air spring is equal to the second target height.

13. The vehicle according to claim 8, wherein the processor is further configured to:
determine that the height of the first axle or the second axle is inconsistent with a target height, before adjusting, in response to determining that the spring air pressure and the air tank air pressure meet the preset condition, the height of the first axle by controlling the connection or disconnection of the air circuit between the air spring and the air storage tank.

14. A non-transitory computer readable storage medium, storing a computer program instruction, wherein when the computer program instruction when executed by a processor in a vehicle, cause the processor to perform a method comprising:
obtaining a spring air pressure of an air spring in an air suspension system of the vehicle, wherein the air spring comprises a first air spring and a second air spring;
obtaining an air tank air pressure of an air storage tank in the air suspension system of the vehicle, wherein the air spring and the air storage tank are connected through an air circuit in the air suspension system of the vehicle and the spring air pressure of the air spring is greater than the air tank air pressure of the air storage tank
adjusting, in response to determining that the spring air pressure and the air tank air pressure meet a preset condition, a height of the vehicle by controlling connection or disconnection of the air circuit between the air spring and the air storage tank wherein the adjusting the height of the vehicle is performed by:
adjusting, in response to determining that an initial air pressure of the first air spring is smaller than an initial air pressure of the second air spring, a height of a first axle corresponding to the first air spring by controlling the air circuit between the first air spring and the air storage tank to be connected,
controlling the air circuit between the first air spring and the air storage tank to be disconnected in response to determining that the height of the first axle corresponding to the first air spring is equal to a first target height, adjusting a height of a second axle corresponding to the second air spring by controlling the air circuit between the second air spring and the air storage tank to be connected, and disconnecting the air circuit between the second air spring and the air storage tank in response to determining that the height of the second axle corresponding to the second air spring is equal to a second target height.

15. The non-transitory computer readable storage medium according to claim 14, wherein the processor is further configured to:

determine that the spring air pressure and the air tank air pressure meet the preset condition in response to determining that an air pressure difference value between the spring air pressure and the air tank air pressure is greater than or equal to an air pressure threshold.

16. The non-transitory computer readable storage medium according to claim 15, wherein the processor is further configured to:

obtain an initial height of the first axle and the second axle; and determine the air pressure threshold according to the initial height and a target height.

17. The non-transitory computer readable storage medium according to claim 15, wherein the processor is further configured to:

obtain a first height difference value between an initial height of the first axle corresponding to the first air spring and the first target height, and a second height difference value between an initial height of the second axle corresponding to the second air spring and the second target height;

adjust, in response to determining that the first height difference value is smaller than the second height difference value, a height of the first axle corresponding to the first air spring by controlling the air circuit between the first air spring and the air storage tank to be connected;

disconnect the air circuit between the first air spring and the air storage tank in response to determining that the height of the first axle corresponding to the first air spring is equal to the first target height;

adjust the height of the second axle corresponding to the second air spring by controlling the air circuit between the second air spring and the air storage tank to be connected; and disconnect the air circuit between the second air spring and the air storage tank in response to determining that the height of the second axle corresponding to the second air spring is equal to the second target height.

* * * * *

UNITED STATES PATENT AND TRADEMARK OFFICE
CERTIFICATE OF CORRECTION

PATENT NO. : 12,291,066 B2
APPLICATION NO. : 17/895485
DATED : May 6, 2025
INVENTOR(S) : Feng Tao Page 1 of 1

It is certified that error appears in the above-identified patent and that said Letters Patent is hereby corrected as shown below:

In the Specification
In Column 3, Line 47, delete "in step" and insert -- In step --, therefor.
In Column 7, Line 22, delete "S231a~S234a," and insert -- S231a-S234a, --, therefor.
In Column 9, Line 2, delete "S231b~S235b," and insert -- S231b-S235b, --, therefor.
In Column 9, Line 50, delete "S236b~S2310b," and insert -- S236b-S2310b, --, therefor.
In Column 13, Line 59, delete "ultra wide band" and insert -- ultra-wideband --, therefor.
In Column 15, Line 31, delete "Beidou" and insert -- BeiDou --, therefor.

In the Claims
In Column 22, Line 50, in Claim 14, delete "tank" and insert -- tank; --, therefor.
In Column 23, Line 25, in Claim 17, delete "claim 15," and insert -- claim 14, --, therefor.

Signed and Sealed this
Eighth Day of July, 2025

Coke Morgan Stewart
*Acting Director of the United States Patent and Trademark Office*